United States Patent
Mandelkow et al.

[15] 3,645,789
[45] Feb. 29, 1972

[54] CLEANSING PROCESS

[72] Inventors: Dietrich Mandelkow, Knapsack near Cologne; Hugo Werner, Hermulheim near Cologne, both of Germany

[73] Assignee: Knapsack Aktiengesellschaft, Knapsack near Cologne, Germany

[22] Filed: Sept. 15, 1969

[21] Appl. No.: 858,155

[30] Foreign Application Priority Data

Sept. 18, 1969 Germany .................. P 17 96 190.9

[52] U.S. Cl. .................. 134/2, 134/22 R, 252/103
[51] Int. Cl. .................. B08b 3/08
[58] Field of Search .................. 134/2, 22; 252/95, 103, 104; 23/223

[56] References Cited

UNITED STATES PATENTS 3,293,148  12/1966  Dell .................. 252/103

*Primary Examiner*—Joseph Scovronek
*Assistant Examiner*—D. G. Millman
*Attorney*—Connolly and Hutz

[57] ABSTRACT

Process for cleansing soiled apparatus parts, especially the pipe systems and vapor sides of surface condensers. The soilings include yellow phosphorus, red phosphorus, phosphorus sludge or mixtures thereof, which may be further contaminated with arsenic, antimony and/or compounds thereof. The cleansing operation is carried out using an aqueous solution of sodium peroxide or of a mixture of sodium carbonate and hydrogen peroxide.

7 Claims, No Drawings

CLEANSING PROCESS

The present invention relates to a process for cleansing apparatus parts, e.g., the pipe systems and vapor sides of surface condensers soiled by or covered with crusty material including yellow and/or red phosphorus, phosphorus sludge or mixtures thereof, that may be further contaminated with arsenic, antimony and/or compounds thereof.

The production of phosphorus, for example, is known to give rise to soiling and incrustation of the vapor sides of surface condensers. The production of phosphorus in electrothermal reduction furnaces is more particularly known to be accompanied by the evolution of a phosphorus furnace gas, which substantially consists of phosphorus in vapor form and carbon monoxide. The gas which has a temperature of about 350° C. and is first freed from dust in electrostatic precipitators is freed then from the bulk of phosphorus therein by spraying it in a so-called warm water tower, using cycle water having a temperature of between about 50° and 70° C. This effects condensation of the phosphorus in vapor form. Carbon monoxide also issues from the warm water tower. At a temperature of 50° C., it is found to still contain at least 1.8 grams phosphorus per cubic meter, and at 70° C., it is found to even contain at least 6.7 grams phosphorus per cubic meter. The bulk of the phosphorus therein is recovered by treatment of the CO-gas in a so-called cold water tower, using cycle water at a temperature between 10° and 40° C. The cycle water which is subject to a rise in temperature is released under a pressure of about .40 mm. mercury in a bypass refrigerator, cooled thereby and recycled to the cold water tower. Inside the evaporator or flash device, the water is evaporated to effect heat dissipation. The resulting phosphorus-containing vaporous matter is suction removed from the evaporator by means of a so-called vapor condenser, condensed and precipitated in surface condensers (tubular heat exchangers charged with cooling water) together with the phosphorus component and further contaminants therein.

The phosphorus component and further contaminants are difficult to remelt. The reason for this is that phosphorus precipitated from so dilute a vapor-gas mixture contains a considerable proportion of oxide skins. These prevent the phosphorus from flowing together on heating it to a temperature above its fusion point. While the said further contaminants including arsenic, antimony and/or compounds thereof, particularly oxides, are substantially present in traces, the fact remains that they considerably contribute to making incrustations and dirt components firmly adhere to the apparatus.

Steam jet vacuum pumps are used to suction remove from the cooling system uncondensable gas which is allowed to escape into the atmosphere. After some time, the vapor sides of the surfaces condensers will be found to have been soiled with the result that the heat transmission coefficient is reduced.

Attempts have been made to remedy this by subjecting the vapor sides of surface condensers to a hot water wash, at intervals of about 2 to 4 weeks. This type of treatment, which merely enabled the soiled apparatus parts to be partially freed from dirt components and incrustations, has failed to produce satisfactory and permanent results. Still further, it has been found that cleansed surface condensers reset to work are far from approaching their initial heat transmission coefficient of 900 (kcal/sq.m. °C. · hr.). Attempts made with the object of mechanically cleansing soiled or encrusted surface condensers also failed to produce satisfactory results. The fact that only about 5 percent of the overall cooling surface is accessible from the outside occasioned this.

The object of the present invention is to provide a process for cleaning soiled or encrusted apparatus parts, particularly the pipe system and vapor sides of surface condensers. In other words it is the object of the present invention to provide a satisfactory process which is free from the deficiencies reported above and enables soilings or incrustations to be readily removed. To this end, the present invention substantially provides for the soiled and encrusted apparatus parts to be treated with an aqueous solution producing an alkaline and oxidizing effect.

In carrying out the present process, it is advantageous to use a dilute solution to avoid the occurrence of spontaneous reactions and corrosion. The aqueous solutions include more particularly solutions of sodium peroxide or sodium carbonate and hydrogen peroxide.

Solutions containing up to 20 weight percent sodium carbonate and hydrogen peroxide, preferably up to 7 weight percent sodium carbonate and up to 2 weight percent hydrogen peroxide, have been found to produce very advantageous cleansing effects. In those cases in which a sodium peroxide solution is used, it should preferably contain up to 6 weight percent sodium peroxide.

The cleansing operation is advantageously carried out within a range between 60° C. and a temperature approaching the boiling temperature of the solution by using the reaction heat evolved by the solution itself, or by supplying, for example, steam. Following the cleaning step, the solution may be brought to boiling, if necessary or convenient.

In accordance with a further feature of the present invention, the cleansing operation is carried out for a period of up to 24 hours, the solution being circulated, if necessary or convenient.

The particular advantage offered by the cleansing process of the present invention resides in the fact that the cleansing solutions producing an alkaline and oxidizing effect enable the walls of apparatus structures, especially surface condensers, to be readily freed from contaminants or crusty material, which are dissolved or suspended therein. Combustible, ill-smelling and toxic hydrogen compounds contained in the above contaminants or crusty material are simultaneously oxidized to relatively harmless substances.

EXAMPLE 1    (Comparative Example)

The vapor sides of surface condensers soiled by or encrusted with contaminated yellow phosphorus, red phosphorus, phosphorus sludge, arsenic, antimony and/or compounds thereof, were shut down for some short time, for example by closing the corresponding inlet and outlet pipes. The emptied surface condensers, i.e., the vapor sides thereof, were rinsed using hot water, or boiled in water. The water with a portion of the contaminants therein was discharged from the vapor sides and the condensers were used again. The cleansing effect was very unsatisfactory. This was demonstrated by the fact that the cleansed condensers merely enabled the so-called cold condensation water to be cooled to about 40° C., which is a relatively high temperature. The reason for this was that the heat transmission coefficient had dropped to about one-fifth of its initial value of 900 (kcal/sq.m. °C. · hr.).

EXAMPLE 2    (Process of Invention)

The vapor sides of surface condensers soiled by or encrusted with phosphorus (yellow and red phosphorus, phosphorus sludge or mixtures thereof, including e.g., arsenic, antimony and/or compounds thereof as further contaminants) were shut down for some short time, for example, by closing the corresponding inlet and outlet pipes. The emptied surface condensers covered with crusty material 3 mm. thick, i.e., the vapor sides thereof, were filled with an aqueous solution containing 7 weight percent sodium carbonate and 2 weight percent hydrogen peroxide. In this example (incrustations 3 mm. thick) the solution was allowed to act upon the vapor sides of the surface condensers for a period of 24 hours, at 80° C., and the solution having the contaminants dissolved or suspended therein was discharged. The cleansed surface condensers were found to have a heat transmission coefficient of 900 (kcal/sq.m. °C. · hr.). They enabled the cold condensation water to be cooled down to 26° C.

EXAMPLE 3 (Process of Invention)

Surface condensers were cleansed in the manner set forth in Example 2 save that the solution was not allowed to remain over the whole treatment period inside the condenser but was continually circulated through the condensers' vapor sides. The solution which had a concentration the same as that of the solution used in Example 2 enabled the condensers to be cleansed after as short a period as 10 hours, and the initial heat transmission coefficient of 900 (kcal/sq.m. °C. · hr.) to be reestablished. This enabled the cold condensation water to be cooled down to 26° C.

EXAMPLE 4 (Process of Invention)

Condensers were cleansed in the manner set forth in Example 3 save that the solution contained 4 weight percent sodium carbonate and 1.5 weight percent hydrogen peroxide. In this example (incrustations 3 mm thick) it was necessary for the condensers to be treated for a period of 24 hours to reestablish a heat transmission coefficient of 900 (kcal/sq.m. °C. · hr.). During the cleansing step, it was necessary to test the solution from time to time and to reestablish its initial concentration of 4 weight percent sodium carbonate and 1.5 weight percent hydrogen peroxide.

EXAMPLE 5 (Process of Invention)

Surface condensers were cleansed in the manner set forth in Example 2 save that the solution was heated to a temperature approaching boiling temperature. The solution can be heated in various ways, for example, by flowing hot water or steam through the cooling sides of the surface condensers, or using the reaction heat evolved by the solution itself. After 16 hours, the condensers so cleansed were found to have a heat transmission coefficient of 900 (kcal/sq.m. m. °C. · hr.). This enabled the cold condensation water to be cooled down to 26° C.

EXAMPLE 6 (Process of Invention)

Surface condensers were cleansed in the manner set forth in Example 3 save that the solution was heated to a temperature approaching boiling temperature. The heating step can be effected in various ways, for example, in the manner described in Example 3. After 8 hours, the cleansed condensers (incrustations 3 mm thick) were found to have regained their initial heat transmission coefficient of 900 (kcal/sq.m. °C. · hr.). This enabled the cold condensation water to be cooled down to 26° C.

EXAMPLE 7 (Process of Invention)

The vapor sides of condensers were treated in the manner set forth in Example 2 to 6 hereinabove. Following this, they were rinsed using hot water, at 80° C. This enabled the condensers to be freed even from traces of loosely adhering contaminants.

We claim:

1. A process for cleansing apparatus parts encrusted with elementary phosphorus and contaminated with an impurity from the group of arsenic, antimony or compounds thereof, which comprises preparing an aqueous solution containing an alkaline oxidative component selected from the group consisting of sodium peroxide and a mixture of sodium carbonate and hydrogen peroxide, treating the elementary phosphorus with said solution within a temperature range of 60° C. up to substantially the boiling temperature, producing heat set free by the reaction of said solution, converting the elementary phosphorus to water-soluble phosphorus-oxygen compounds and subsequently removing said phosphorus-oxygen compounds from said apparatus parts.

2. The process as claimed in claim 1 wherein the solution contains up to 6 weight percent sodium peroxide.

3. The process as claimed in claim 1 wherein the solution contains up to 20 weight percent of the sodium carbonate and hydrogen peroxide mixture.

4. The process as claimed in claim 1 wherein the solution is heated by the supply of steam.

5. The process as claimed in claim 1 wherein the solution is brought to boiling after termination of the cleansing operation.

6. The process as claimed in claim 1 wherein the cleansing operation is carried out for a period of up to 24 hours.

7. The process as claimed in claim 1 wherein the cleansing operation is carried out with circulation of the said solution.

* * * * *

PO-1050
(5/69)

UNITED STATES PATENT OFFICE
CERTIFICATE OF CORRECTION

Patent No. 3,645,789         Dated Feb. 29, 1972

Inventor(s) Mandelkow et al

It is certified that error appears in the above-identified patent and that said Letters Patent are hereby corrected as shown below:

Front page, under [30], the priority date of the German application should read -- September 18, 1968 -- .

Signed and sealed this 6th day of February 1973.

(SEAL)
Attest:

EDWARD M. FLETCHER, JR.
Attesting Officer

ROBERT GOTTSCHALK
Commissioner of Patents